United States Patent [19]

Schnalke

[11] Patent Number: 4,461,094
[45] Date of Patent: Jul. 24, 1984

[54] PROCESS AND APPARATUS FOR DRYING VEHICLES

[75] Inventor: Heinz H. Schnalke, Goetzenhain, Fed. Rep. of Germany

[73] Assignee: Böhm + Braunwalder KG, Augsburg, Fed. Rep. of Germany

[21] Appl. No.: 405,185

[22] PCT Filed: Dec. 29, 1981

[86] PCT No.: PCT/EP81/00208
 § 371 Date: Aug. 4, 1982
 § 102(e) Date: Aug. 4, 1982

[87] PCT Pub. No.: WO82/02366
 PCT Pub. Date: Jul. 22, 1982

[30] Foreign Application Priority Data

Dec. 30, 1980 [DE] Fed. Rep. of Germany ....... 3049465

[51] Int. Cl.$^3$ ............................ F26B 3/00; F26B 7/00; F26B 5/32; F26B 19/00
[52] U.S. Cl. .............................................. 34/9; 34/12; 34/39; 34/60; 34/225; 432/37
[58] Field of Search ...................... 34/9, 12, 39, 60, 73, 34/202, 225; 432/37

[56] References Cited

U.S. PATENT DOCUMENTS 2,472,293 6/1949 Groven ..................................... 34/60
4,168,579 9/1979 Ericsson .................................. 34/46
4,327,133 4/1982 Rudy et al. ................................ 34/9

FOREIGN PATENT DOCUMENTS 1430718 4/1969 Fed. Rep. of Germany .
1924094 11/1970 Fed. Rep. of Germany .
2834582 2/1980 Fed. Rep. of Germany .
2432958 3/1980 France .
1029004 5/1966 United Kingdom .

OTHER PUBLICATIONS

DE–Journal, "Tankstelle & Garage," No. 11, 1969, p. 533.

Primary Examiner—John J. Camby
Attorney, Agent, or Firm—McCormick, Paulding & Huber

[57] ABSTRACT

The description is of a method for drying vehicles in washing establishments in which after the washing or clear rinsing step and before the drying step water containing a wetting agent is applied to produce a substantially uniform thin water film on the vehicle, wherein the drying is achieved through infrared ray generators or by means of other heat ray generators, and the moist air is withdrawn. An apparatus for carrying out this method is also described. The thin water film guarantees a rapid evaporation of the water from the outer surface of the vehicle with reasonable energy consumption and at the same time serves as an overheating protective device for the vehicle surface.

13 Claims, 1 Drawing Figure

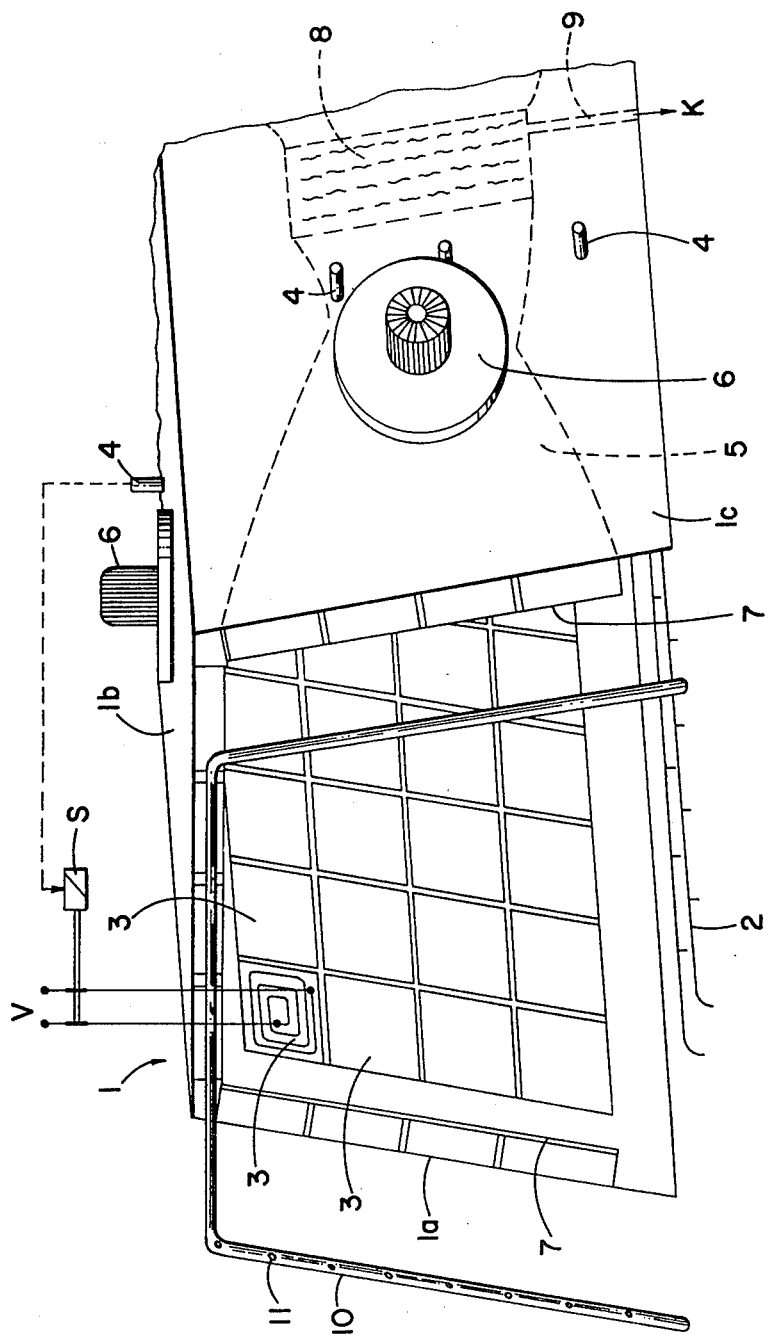

PROCESS AND APPARATUS FOR DRYING VEHICLES

TECHNICAL AREA

The invention concerns a method and an apparatus for drying vehicles in washing establishments.

STATE OF THE ART

The most widely used method for drying vehicles in washing establishments is the use of large high powered drying blowers. In this method the water in advance of the drying step has added to it a surface tension chemical means which has the effect that the water pulls itself together into large drops which can be peeled off of the surface of the vehicle by the air current. Disadvantages are that the high powered drying blowers have a high energy consumption, create very much noise and are therefore not very environmentally acceptable. The large amount of noise produced by such blowers has made it such that washing establishments equipped with such blowers are not allowed to be set up in the middle of residential areas, but only outside of such areas, for example in industrial areas.

Indeed a method has already been made known (German Periodical "Tankstelle+Garage" Volume 11, 1969, Page 533), in which the water has added to it chemical means which chiefly lower the tension of the water so that the major portion of it runs off while the remaining portion of the water becomes partially underlaid by the chemical means to accelerate the drying and to avoid spots. In this method air drying is involved with out the use of blowers, for the vehicles are simply set in the open after washing and are left in the open until dry. A washing establishment using this drying method can be set up in a residential area since it creates no noise, but nevertheless it does have the disadvantage that the drying step requires too much time. This method in which the drying effect makes use of the surrounding air has therefore today been almost entirely surpassed.

British Pat. No. 1,029,004 discloses an apparatus for washing and drying vehicles in a portal washing establishment in which heat lamps are used for drying the vehicles. Such an apparatus has never found an entry into practice and has never appeared in a realizable form on the market. The reason for this resides in the fact that with such apparatus it is not possible to achieve such a complete drying that the vehicle after the drying is free of drops. The removal of residual drops takes too long with this apparatus in comparison to the time required for the drying of vehicles in present day washing establishments wherein the vehicles are moved with a speed of between 14 meters a minute and 18 meters a minute through the plant. In connection with this the upper surface of the drops on which the infrared energy delivered by the heat lamps works is too small for the drops to take in sufficient energy to be brought to a state of evaporation in a reasonable amount of time. A further disadvantage is that the large portion of the vehicle body not covered by the drops is struck by the infrared energy as a result of which the surface of the vehicle body is unnecessarily overheated and is moreover unevenly heated. Further, this known apparatus has the disadvantage that because of the short building length the portal arches must work with high heat lamp power which not only amplifies the danger of overheating the vehicle surface but also leads to a corresponding waste of energy. Finally there exists as yet a prejudice against infrared drying because it can burn plastic parts which are increasingly being used on automobile bodies and because it does not avoid leaving visible spots and residues on the vehicle surface after the drying process. Moreover the known portal washing establishments are not made without supplementary blower drying because the heat lamps are provided only in the two vertical portions of the portal arches and the upper side of the vehicle is dried solely by means of a blower type air current.

German OS No. 19 24 094 discloses a drying plant of tunnel construction for washed vehicles in which the drying tunnel is provided with blowers for circulating air and the damp air is withdrawn from the drying tunnel, is warmed through a heat exchanger and is returned to the drying tunnel. In the case of this plant, to avoid the disadvantage of a high level of sound connected with the necessary high powered blowers, an expensive noise isolation is provided in the tunnel walls, and for operating the heat exchanger additional energy is required, for example heating oil for an associated oil burner which heats the heat exchanger. This known plant is therefore costly both in its manufacture as well as in its operation.

SUMMARY OF THE INVENTION

The object of the invention is to so improve a method and apparatus for drying vehicles in a washing plant that the drying process is made faster, easier and more energy conserving.

This object is solved by the features given in the characterizing portion of patent claim 1 or in the characterizing portion of patent claim 4.

In accordance with the method of the invention a vehicle during its drying is covered on its surface with a thin uniform water film (feature a), which serves as an overheating shield for the vehicle surface and especially for plastic parts and guarantees a rapid evaporation of the water, so that as a result of an adequate dose of wetting agent no residue is visible on the vehicle surface after the drying step and the vehicle leaves the drying area entirely dry and free of drops; use is made of infrared or other heating rays for the drying (feature b), which in combination with the thin uniform water film takes care of the rapid evaporation of the water with reasonable energy use; and the damp air is withdrawn (feature c) so that the advantage of direct energy contact of the vehicle by the infrared or other heat rays is obtained through the avoidance of a heat absorbing humid air veil and so that the drying step is substantially accelerated. By means of the inventive apparatus as defined in claim 5 the energy of the infrared ray generators which are distributed over the inner walls of the tunnel, and whose current supply is controlled by temperature sensors, is directed onto the entire vehicle surface and at the same time the amount of delivered energy is limited to an optimal value.

In the invention as set out by claims 2 to 5 the washing plant operates in an environmentally acceptable way because the air is not blown into the surrounding atmosphere, but instead is solely circulated and conducted back to the drying area. The circulation of the air takes place in little time and with substantially less noise being developed in comparison to that developed by plants equipped with large high powered blowers.

In the invention as set out by claims 3 and 6 heat is recovered in the removal of water from the humid air which recovered heat can be used for the heating of recovered water in the washing plant or for the heating of the washing plant itself.

In the invention as set out by claims 7 to 13 surfactants contained in the wetting agent insure an adhesion to the vehicle surface so that a residue of the same remains which permits a spotless run off of the water film.

SHORT DESCRIPTION OF THE DRAWING

The single FIGURE of the drawing shows an infrared drying apparatus.

EMBODIMENT OF THE INVENTION

The drying apparatus includes an elongated drying tunnel 1 with tunnel walls 1a, 1b and 1c which are associated with an apparatus for supplying a wetting agent containing water, which apparatus is shown schematically as an arched tube 10 with inwardly directed discharge orifices distributed over its entire length. In place of the arrangement shown this apparatus could also this be integrated with the clear rinsing station of the washing establishment. The drying tunnel 1 is arranged at the end of a customary vehicle washing establishment along the vehicle pathway as represented by the wheel guide rails 2. The tunnel walls 1a, 1b, 1c are covered on their inner surfaces with infrared ray generating devices 3 with only the infrared ray generator in the upper left portion of the figure being shown. Also, in the tunnel walls are temperature sensors 4 which are distributed generally uniformly in a row over the circumference of the tunnel and which remotely sense the temperature of the vehicle surface. The temperature sensors 4 are connected with a control apparatus for controlling the current to the infrared ray generators 3, which control apparatus is shown schematically as an electric relay for only one of the infrared ray generators, so that when the temperature of the vehicle surface goes above a preset temperature indicating that the water film has evaporated, the infrared ray generators can be turned off as needed.

The tunnel walls 1a, 1b, and 1c contain air ducts 5. For circulating the air blowers 6 are arranged in these ducts. The air ducts have inlet openings for the air which is humidified by the drying process between the infrared ray generators 3 and drying air outlet openings 7 at the tunnel entrance, by means of which the air is again delivered to the drying area inside of the tunnel 1. In the air conducting ducts 5 the moist air which is withdrawn by the blowers 6 moves over a drying register 8 in which its moisture is released and to which an associated condensor K is connected through a conductor 9. The drying register 8 can serve as a heat exchanger in a nonillustrated energy recovery circuit in which in another place in the washing plant the water used can be warmed for washing or for heating.

The surfactants contained in appropriate wetting agents are non-ionogen surfactants such as ethoxylates having 3 to 10 EO per mol alkyl phenol (e.g. nonyl phenol) as well as synthetic branch-chained fatty alcohols, e.g. iso tridecyl alcohol, along or in admixture with conventional anionic surfactants of the sulphonate and sulphate type.

The effect of obtaining a thin aqueous film suited for infrared drying may be improved by portions of linear fatty alcohols having a chain length of C16–C18 amounting up to five percent at most, based on the amount of surfactant, as well as by additions of organic mono- and polycarboxylic acids, such as formic, acetic, citric and similar acids adjusting a Ph in the concentrate to between 1 and 6.

In keeping with the invention instead of infrared ray generators other heat generators may be used, as for example those which work with solar energy.

INDUSTRIAL UTILITY

Vehicle washing establishments.

I claim:

1. A method for drying a vehicle in a washing establishment after a washing or clear rinsing step, said method comprising:
   (a) after washing or clear rinsing the vehicle and before drying it applying water containing a wetting agent to the vehicle to achieve a substantially uniform thin water film,
   (b) then drying the vehicle by means of infrared ray generators or by means of other heat ray generators, and
   (c) withdrawing the moist air produced by said drying step.

2. A method according to claim 1, further characterized by drying said withdrawn moist air and returning it to the drying area.

3. A method according to claim 3, further characterized by removing heat from said withdrawn moist air by means of a heat exchanger for energy recovery.

4. An apparatus for drying a vehicle in a washing establishment after a washing or clear rinsing step, said apparatus comprising: a drying tunnel through which the vehicle is moved with at least one blower for circulating air through said tunnel, a device at the entrance of said tunnel for applying water containing a wetting agent to the vehicle to achieve a substantially uniform thin water film on the vehicle, infrared ray generators distributed over the tunnel for applying heat to said vehicle to dry the same, said tunnel having walls with inner surfaces, and a number of temperature sensors distributed over said inner surfaces of said tunnel walls for remotely sensing the temperature of the vehicle outer surface and for controlling the current supplied to said infrared ray generator.

5. An apparatus according to claim 4 further characterized by an air drying register associated with the air circulated by said blowers, and air ducts in said tunnel walls forming part of the circulated air path, said ducts having dry air outlet openings at said tunnel entrance.

6. An apparatus according to claim 4 and 5 further characterized in that the air drying register is part of an energy recovery circuit.

7. A method according to claim 1, 2 or 3 further characterized by using as said wetting agent a material having as an ingredient at least one non-ionogen surfactant.

8. A method according to claim 7, further characterized in that the non-ionogen surfactant(s) is (are) ethoxylate(s) with 3 to 10 EO per mol alkyl phenol as well as synthetic branch-chained fatty alcohol alone or in admixture with conventional anionic surfactants of the sulphonate and sulphate type.

9. A method according to claim 8 further characterized in that the ethoxylate(s) contains nonyl phenol.

10. A method according to claim 8 further characterized in that the ethoxylate contains iso tridecyl alcohol.

11. A method according to claim 7 further characterized in that up to five percent at most, based on the amount of surfactant, of linear fatty alcohols having a chain length of C16-C18 as well as further additions of organic mono- and polycarboxlic acids are included in said wetting agent and adjust the Ph value in the concentrate to between 1 and 6.

12. A method according to claim 11 further characterized in that said further additions are formic, acetic and/or citric acids.

13. A method according to claim 7 further characterized by said wetting agent including ingredients in the form of a single or multiple component system which possess a caring, cleaning, protecting, polishing and/or other similar property.

* * * * *